Sept. 23, 1969     W. F. CRAMER, JR     3,468,125
SEGMENTAL PROPELLANT GRAIN

Filed Oct. 29, 1953

INVENTOR.
William F. Cramer Jr.
BY
*H. E. Thibodeau + A. W. Dew*
ATTORNEYS

United States Patent Office
3,468,125
Patented Sept. 23, 1969

3,468,125
SEGMENTAL PROPELLANT GRAIN
William F. Cramer, Jr., Oak Park, Ill., assignor, by mesne assignments, to the United States of America as represented by the Secretary of the Army
Filed Oct. 29, 1953, Ser. No. 389,183
Int. Cl. F02k 9/04; F02c 3/26
U.S. Cl. 60—39.47
4 Claims This invention relates to a multiple grain propellant powder charge and a method for forming same.

An object of the invention is to provide a propellant powder charge which can be bonded to the inner wall of a rocket motor casing to resist breaking or crumbling of the charge due to high ballistic forces engendered in launching.

Another object of the invention is to provide means for molding the propellant powder charge inside the rocket motor in multiple circumferentially spaced grains.

Another object of the invention is to provide multiple powder grains having wedge shaped inner faces which produce a cross-sectional configuration favorable to quick and complete combustion.

Another object of the invention is to provide a propellant powder charge which will withstand the forces of setback when launched at high velocities.

A further object of the invention is to provide a propellant powder charge bonded to the motor casing and which will resist breaking the bond during changes in ambient temperature during storage, regardless of the difference in the coefficient of thermal expansion between the casing and the bonded powder charge.

A still further object of the invention is to provide resilient spacer members between each propellant powder grain to allow for expansion and contraction of the powder grains without serious stresses in the inhibiting layer or the propellant.

Another object is to provide a method by which a rocket motor effecting the foregoing objects and advantages can be easily and inexpensively produced in quantity lots.

Other objects and advantages will be apparent from the following detailed description and the accompanying drawings, in which.

Figure 1:
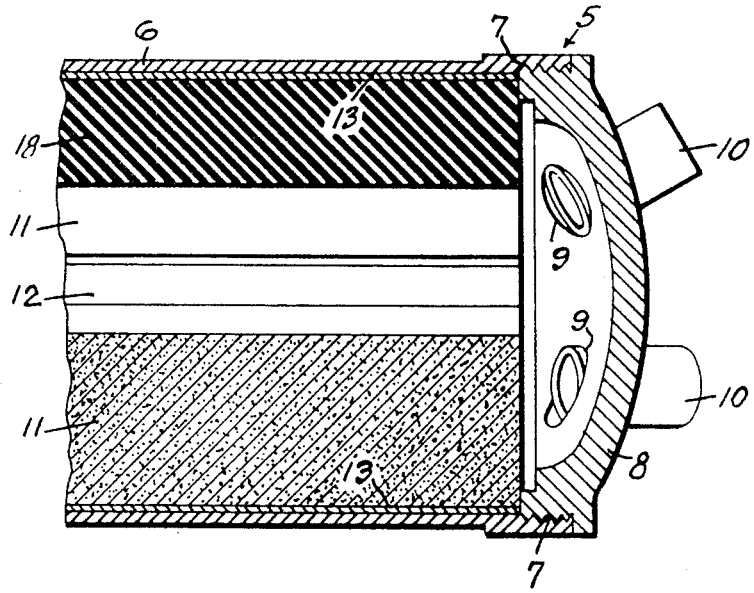
FIGURE 1 is a longitudinal sectional view through the rear end of a spin stabilized rocket motor taken on the line 1—1 of FIGURE 3.
Figure 2:
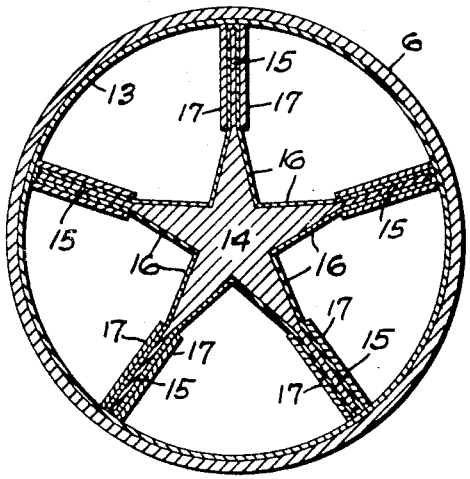
FIGURE 2 is a cross sectional view of the casing of the motor illustrated in FIGURE 1 showing a molding core inserted therein.
Figure 3:
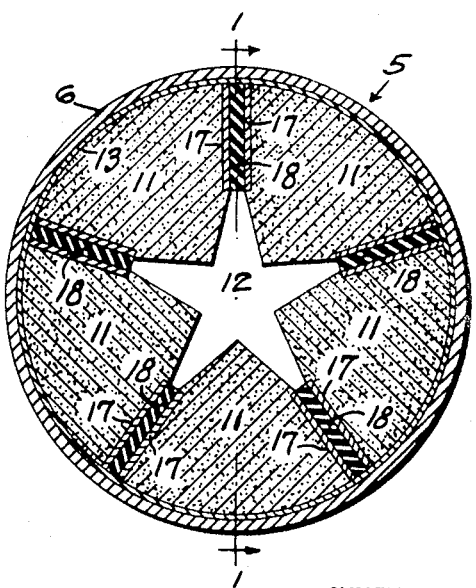
FIGURE 3 is a cross sectional view of the motor showing the finished grains and their resilient separator elements.

In the past great difficulty has been experienced in preventing the breakage of molded rocket powder grains when launched and when in storage where ambient temperature changes are great or sudden. When a spin stabilized rocket is launched at a high velocity, the forces of setback and centrifugal action individually and in combination tend to cause crumbling and breakage of the grain, resulting in a loss of propellant crumbs through, or clogging of the venturi nozzles. In rockets made with a steel casing housing a one-piece axially perforated grain, bonded to the motor wall, the coefficient of thermal expansion for most propellants is many times that of the metal, the result being that with a drop in temperature, the grain will shrink more than the motor tube wall and tend to break its bond and pull away from the wall. This difficulty is overcome in the present invention by the use of a segmented or multiple grain charge, each grain of which is separately bonded to the motor tube wall.

In the drawings, wherein for the purpose of illustration, is shown one form of the invention. The reference character 5 indicates the rear portion of a rocket motor having a thin walled casing 6 of steel or other material of suitable strength. Secured to the rear end of the casing by screw-threads 7 or otherwise is a nozzle plate 8 having openings 9 in which any desired number of nozzles 10 may be secured at the proper angle to the longitudinal axis of rotation of the rocket to produce the required stabilizing rotation.

Any number of separate grains 11 may be molded within the casing, as required by rocket motors of different calibers, but in the present showing the multiple wedge-shaped grains are shown as five in number and form a star-shaped opening 12. Initial firing of the charge starts in this opening in the same manner as in a single solid star-perforated grain. A propellant suitable for use in segmental grains is Thiokol-perchlorate (T10). A portion of "Thiokol," without the oxidizer, is used as an inhibitor to bond the grains to the casing wall. As is well known "Thiokol" is prepared by heating ethylene dichloride and sodium polysulfide to form the structure $(C_4H_8S_4)x$. The inhibitor or binder is poured into the casing 6 which is then rotated on its axis of symmetry to evenly distribute a layer 13 thereof over the casing wall after which the casing is heated to partially cure the inhibitor. After partial curing of the inhibitor a mandrel comprising a central core 14 having fins 15 radiating therefrom and extending to the casing wall, is inserted therein. A mold release agent 16, such as Teflon, having been previously applied to the core and the fins thereof to permit easy removal of the core after curing of the grains. A layer 17 of the inhibitor Thiokol is also applied to the fins 15 over the release agent previous to insertion of the core 14 into the casing.

The propellant is then poured into the open spaces defined by radial arms of the core 14 and the inside wall of the casing 6 to form the wedge shaped grains 11.

The casing is again heated to finally cure the charge and securely bond the grains 11 to the inhibitor 13 on the inside wall of casing 6. After the grains are cured the core 14 is removed and separator strips 18 of rubber or other resilient material are inserted between the grains 11 in the spaces formerly occupied by the fins 15 of the core 14.

The inhibitor layers 17 bond the separate grains to the resilient strips 18 which yield to the expansion and contraction of the grains and also serve as resilient buffer means between the grains to resist breaking of the bond between the grains and the casing wall due to rotational forces during flight of the rocket motor.

I have thus provided a rocket motor propellant which will burn evenly and completely to attain greater speed and range. The method of manufacture is simple and can be carried out without the use of skilled labor.

I wish it to be understood that I do not desire to be limited to the exact details of the invention shown and described, for obvious modifications will occur to a person skilled in the art.

Having now fully disclosed the invention, what I claim and desire to secure by Letters Patent is:

1. In a rocket motor, a tubular casing, a plurality of spaced apart propellant grains fitting within said casing, each said grain being generally in the form of a sector in cross section transversely of said casing, each said grain being truncated at its apex whereby said grains conjointly define a central longitudinal star shaped flash passage symmetrical about the axes of said casing, inhibitor means bonding each said grain to the contiguous wall of said casing independently of the others, and resilient inert material filling said spaces to inhibit and cushion said grains.

2. In a rocket motor, a tubular casing, a plurality of propellant grains each generally sector-shaped in cross section fitting within said casing, said grains being truncated at their apices to define a central chamber of symmetrical shape in cross-section transversely of said casing, means bonding each grain individually to the contiguous wall area of said casing, and resilient inert strips interposed between the contiguous faces to adjacent grains, to inhibit and cushion said grains.

3. In a propulsion charge for a rocket motor having a tubular casing, a series of separate powder grains circumferentially disposed within said casing, a resilient buffer element separating the adjacent side faces of each grain, and an inhibitor compound between the abutting external faces of each grain and the internal surface of said casing for bonding each grain to the casing.

4. In a propulsion charge for a rocket motor having a propellant chamber, a series of segmental powder grains each grain having an outer adjacent surface of a contour matching the inner surface of said propellant chamber, a layer of an inhibitor material bonding said grain to said chamber surface to resist movement of said grain due to setback forces when fired, side walls closely spaced from similar walls of adjacent grains, a resilient separator strip between each adjacent side wall, a layer of an inhibitor material between said side walls and said resilient separator strip bonding said separator strip to said side wall to resist breakage of said grain and both said bonds due to the effect of rotational forces.

References Cited

UNITED STATES PATENTS

| 2,603,061 | 7/1952 | Avery | 60—35.6 |
| 2,605,607 | 8/1952 | Hickman | 60—35.6 |
| 1,054,049 | 2/1913 | Sukolowski | 86—20 |
| 1,783,372 | 12/1930 | Woodbury | 86—20 |

FOREIGN PATENTS

| 15,363 | 7/1909 | Great Britain. |
| 26,430 | 11/1907 | Great Britain. |
| 659,758 | 10/1951 | Great Britain. |

SAMUEL FEINBERG, Primary Examiner

U.S. Cl. X.R.

60—255